US00RE34397E

United States Patent [19]

DelMonte et al.

[11] E Patent Number: Re. 34,397

[45] Reissued Date of Patent: Oct. 5, 1993

[54] ARROW RINGED BROADHEAD

[76] Inventors: Nicholas J. DelMonte, 270 N. Ogden St., Buffalo, N.Y. 14206; Louis M. Fioretti, 143 Meadowlawn Rd., Cheektowaga, N.Y. 14225

[21] Appl. No.: 814,413

[22] Filed: Dec. 20, 1991

Related U.S. Patent Documents

Reissue of:

[64] Patent No.: 5,044,640
Issued: Sep. 3, 1991
Appl. No.: 683,321
Filed: Apr. 10, 1991

[51] Int. Cl.[5] ..... F42B 6/08

[52] U.S. Cl. ..... 273/422

[58] Field of Search ..... 273/416, 419–422; 30/302

[56] References Cited

U.S. PATENT DOCUMENTS

| | | | |
|---|---|---|---|
| 2,874,968 | 2/1959 | Zielinski | 273/421 |
| 2,888,264 | 5/1959 | Sharrar et al. | 273/420 |
| 3,756,600 | 9/1973 | Maleski | 273/422 |
| 3,910,579 | 10/1975 | Sprandel | 273/422 |
| 3,915,455 | 10/1975 | Savora | 273/422 |
| 4,210,330 | 7/1980 | Kosbab | 273/422 |
| 4,570,941 | 2/1986 | Saunders | 273/422 |
| 4,781,386 | 11/1988 | Armitage | 273/422 |
| 4,986,550 | 1/1991 | Segovia | 273/422 |

*Primary Examiner*—Paul E. Shapiro
*Attorney, Agent, or Firm*—James J. Ralabate

[57] ABSTRACT

An arrow broadhead tip having a plurality of *triangular* razor sharp blades *with cutting edges* spaced equidistant around the circumference of the tip's shaft portion all of which are connected [on their outer razor sharp edge] *at points spaced between the hypotenuse and their cutting edges* by a razor sharp ring of steel. When the arrow is shot or propelled from a bow at a hunting target it hits the skin or hide of the target animal and cleanly cuts a hole into it with a diameter larger than the arrow shaft's diameter thereby providing a means for the animal to profusely bleed to death unimpeded by loose skin or hide closing the hole or the arrow shaft itself plugging the hole it helped create.

13 Claims, 3 Drawing Sheets

ARROW RINGED BROADHEAD

Matter enclosed in heavy brackets [ ] appears in the original patent but forms no part of this reissue specification; matter printed in italics indicates the additions made by reissue.

FIELD OF INVENTION

This invention relates to amusement devices and more specifically to arrows and the configuration and structure of broadheads.

BACKGROUND—DISCUSSION OF PRIOR ART

Heretofore prior art has consisted of a multitude of arrow heads and particularly broadheads used for hunting. The prior art has consisted of numerous efforts to simplify assembly of razor sharp blades in a central core element which mounts to the shaft of the arrow. The numerous configurations show various blade shapes, quantities, and interlocking means. The major problem presented while hunting with such arrows and broadheads is that after the animal has been hit, such as a deer, the animal will run and then must be tracked. The animal will slowly bleed to death but not until after running a great distance and many times will never be found by the hunter due to difficulty tracking the animal. Tracking is very difficult because the hole in the animal is limited to approximately the size of the arrow shaft. This hole in the animal seals itself around the arrow shaft due to the clotting of the blood around the wound. The animal will run a great distance as already mentioned, and will die from internal hemorrhaging and damage to life support organs. Our invention precludes these problems without affecting the performance of the arrow and its accuracy in flight.

OBJECTS AND ADVANTAGES

Accordingly we claim the following objects and advantages of our invention: to provide an arrow broadhead which provides for aerodynamic and unimpeded flight after being propelled or launched from a bow; to provide an arrow broadhead which is capable of cleanly and easily penetrating a large animals outer skin or hide after reaching it within the range of normal arrow air speed; to provide an arrow broadhead which creates a clean void or hole in the animals skin or hide which is larger than the diameter of the arrow shaft itself; to provide a means for allowing an animal struck by our invention, after being legally hunted, to bleed quickly and profusely; to provide a means for more easily tracking an animal legally hunted and hit by our invention through the snow or other ground surface conditions; to provide a means for an animal legally hunted and hit by our invention to die more quickly from rapid loss of blood previously mentioned; to provide an arrow broadhead with a unique means for changing or removing the blades easily and quickly.

LIST OF REFERENCE NUMERALS

10—tip.
12—concave cylindrical void.
14—protuberance.
16—tapered tip shaft.
18—shaft front.
20—shaft rear.
22—snap ring groove.
24—shaft extension.
26—threaded shaft.
28—broadhead shaft.
30 (a through c)—blade grooves.
32 (a through c)—blades.
34—ring blade.
36—sharp cutting edge.
38—major blade portion.
40—second longest side.
42—cutting edge.
44—smaller rectangular shape.
46—shortest side.
48—rectangular void.
50—semi-circular void.
52—snap ring.

DESCRIPTION

Figure 1:
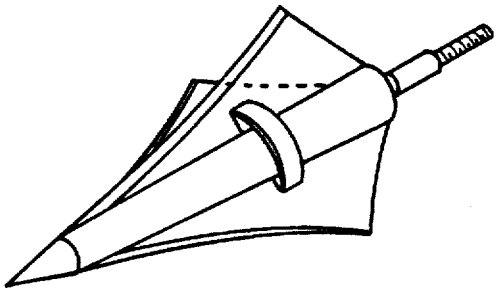
FIG. 1 is a pictorial view of the assembled broadhead tip.
Figure 2:
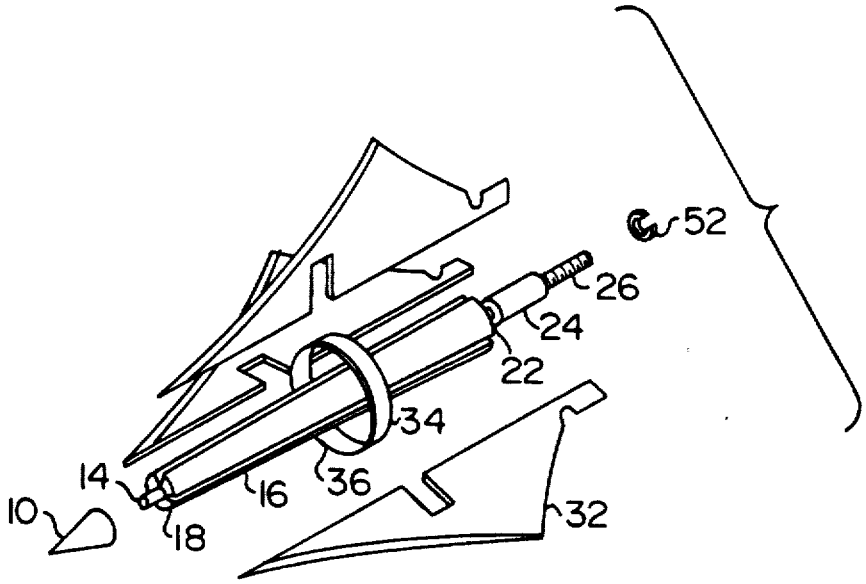
FIG. 2 is an exploded pictorial view of all component parts.
Figure 3:
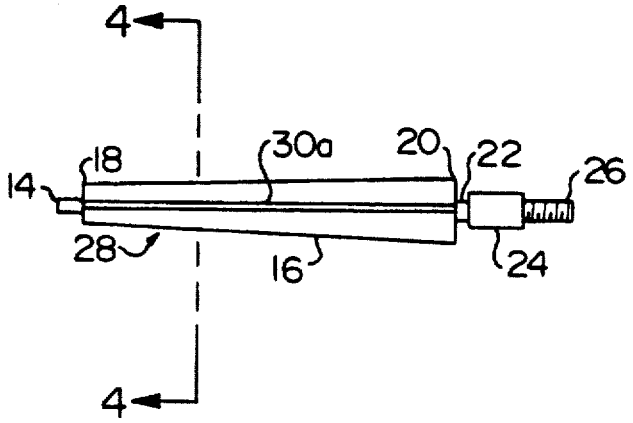
FIG. 3 is a plan view of the tapered tip shaft showing section cutting plane lines 4—4.
Figure 4:
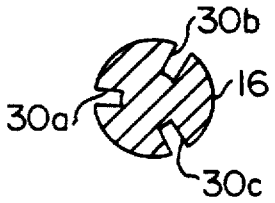
FIG. 4 is a sectional view taken from FIG. 3 showing the cross section of the tapered tip shaft. This sectional view is shown at an enlarged scale for clarity.
Figure 5:
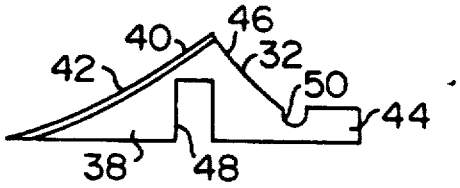
FIG. 5 is a plan view of a blade showing its features and contour.
Figure 7:
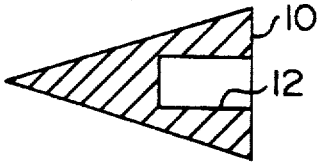
FIG. 7 is a sectional profile view of the sharp conical tip. This view is shown at an enlarged scale for clarity.

Referring to FIGS. 1 and 2 which show assembled and exploded pictorial views respectively, tip (10) made of corrosion resistant hardened steel and having a finely pointed and sharp conical tip and a concave cylindrical void (12) (best shown in FIG. 7) at the opposite end of the sharp tip which accepts and holds protuberance (14) by means of a tight frictional press fit. Protuberance (14) is of cylindrical shape and is a homogenous continuous part of the aluminum tapered tip shaft (16). [The taper of the tapered tip shaft begins at shaft front (18) and gradually tapers to a larger diameter at shaft rear (20).] *The taper of the shaft begins at shaft rear (20) and gradually tapers to a smaller diameter at shaft front (18).* The diameter at shaft front (18) is approximately twice as large as the protuberance (14) diameter (this is best shown in FIG. 2). Also, a continuous and homogenous part of the tapered tip shaft is snap ring groove (22), shaft extension (24), and threaded shaft (26). Snap ring groove (22) is a void created by metal removal so as to form a cylindrical shape of diameter equivalent to that of protuberance (14). Shaft extension (24) is a cylindrical shape of diameter equivalent to the shaft front (18), and the threaded shaft (26) has a major thread diameter equal to or slightly more than the diameter of the snap ring groove. Equally spaced at 120 degrees apart from each other are three blade grooves (30 a through c) which traverse the length of the broadhead shaft (28) at a depth sufficient to penetrate the surface of protuberance (14) along the entire protuberance, tapered tip shaft, and shaft extension, but not the threaded shaft. The blade grooves are tangent to a diameter equal to or slightly greater than the major diameter of the threads on the threaded shaft. The thread on the threaded shaft of this embodiment is a #8-32UNC external thread, but may be another size and form in the infinite other similar embodiments of our invention not shown here. The width of each blade groove is of sufficient dimension to hold blades (32 a through c) in their radial positions with a slight frictional slip fit.

Figure 6:
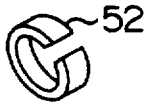
FIG. 6 is a pictorial view of the snap ring. This view is shown at an enlarged scale for clarity.

Ring blade (34) made from stainless steel is a hollow cylindrical cutting blade approximately 0.175" long and having a ground bevel all around one exterior edge of its cylindrical shape extending inward until it meets the interior cylindrical surface, thereby forming a sharp cutting edge (36). Our invention consists of more than one blade (32), but shown herein in this embodiment are three blades (32 a through c), all made from stainless steel. Each blade contour is the sum combination of other more simple or fundamental geometric shapes which best describe its outline. Each blade's major blade portion (38) is best described by a right triangle where the second longest side (40) forms the cutting edge (42) by virtue of a ground bevel from each surface of the blade extending inward toward the center of the blades edge or thickness. Where the hypotenuse meets the shortest side of the triangle, a smaller rectangular shape (44) overlaps the triangle corner formed there so that the hypotenuse and one edge of the rectangle are coincident and that the shortest side of the triangle intersects the opposite side of the rectangle. Both the second longest side of the triangle (40) and the shortest side (46) have a slight curvature inward, or radius, thereby replacing those otherwise straight triangle sides. Approximately halfway along the hypotenuse is a rectangular void (48) normal to the hypotenuse extending toward the opposite corner of the triangular shape. Another void, this one of an extended semicircular shape (50) extends from where the rectangular shape meets the shortest side (46) partially through the rectangular shape. The sharp razor edges of the blades may be either straight or have a slight concave radius upon completion of their fabrication and prior to their sharpening, as shown in the embodiment herein. A snap ring (52) made from a spring-tempered steel is of hollow cylindrical construction with a narrow void through its entire length, best shown in FIG. 6.

OPERATION

Assembly of the invention described herein is accomplished in the following manner: tip (10) is pressed onto protuberance (14). Ring blade (34) is slid over tapered tip shaft (16) and held in place there by the user's hand while three blades (32) are placed into blade slots (30) and so that the front tip of each blade fits snugly against tip (10). Snap ring (52) is then slid over threaded portion (26) and shaft extension (24) before snapping into place in snap ring groove (22) over semi-circular slot (50) of the blades holding them in place. The entire assembly is then threaded into an existing arrow shaft (not shown nor a part of this invention). The arrow is then ready for use with our invention mounted to its front end. As described earlier in Objects and Advantages of this invention, upon hitting its target such as a deer during deer hunting season, a hole significantly larger than the arrow's shaft will be created in the skin or hide of the animal thereby expediting the bleeding, internal organ damage, and death processes.

We claim:

[1. An arrow bradhead tip comprising:

a) A central tapered tip shaft made of aluminum comprising at its formost end a protruding cylindrical feature of diameter smaller than the smallest diameter of any cross section of said taper, and also comprising adjacent to and in line with said protuberance a tapered feature whose foremost diameter is larger than the diameter of said protuberance and which tapers gradually to a larger diameter at the opposite end of said tapered feature, and also comprising adjacent to and in line with said tapered feature a snap ring groove of cylindrical shape and of diameter equal to the diameter of said protuberance at the opposite end of said tapered feature, and also comprising adjacent to and in line with said snap ring groove an extended shaft feature of cylindrical shape and of diameter equal to the said formost end of said tapered feature, and also comprising a threaded shaft feature adjacent to and in line with said extended shaft feature having an external threaded fastening means for connecting the entire said tapered tip shaft to an existing arrow shaft, b) a plurality of blade grooves equally spaced radially around the exterior of said tapered feature of central tapered tip shaft, each being a void with a rectangular box shape penetrating to a depth which is a few thousandths of an inch below the surface of said protuberance and said snap ring groove, and extending from said protuberance to said threaded shaft feature, c) a plurality of blades equal in quantity to said blade grooves and each made of a corrosion resistant hardened steel and having a right-triangular shape with the second longest side of said right-triangular shape having a sharpened razor edge its full length and comprising a rectangular shaped void beginning on the hypotenuse of said right-triangular shape and extending normal to it to a place midway to said razor edge, and comprising a rectangular shaped feature which is located at and includes the corner of said right-triangular shape where said hypotenuse meets the shortest side of said right-triangular shape, and comprising a semi-circular shaped void beginning on the side of said rectangular shape nearest said shortest side of said right-triangular shape and extending midway toward the opposite side of said rectangular shape which is co-linear, or in line, with said hypotenuse, and each of said blades having thickness equal to said blade grooves in said tapered tip shaft so as to have a slight frictional slip fit when said blades fit into said blade grooves, and length of said hypotenuse including said rectangular shape equal to the length of said tapered tip shaft from the point of the smallest diameter of said tapered feature to the beginning of said threaded feature, d) a ring blade having a hollow cylindrical shape of length equal to the widths of said rectangular voids in said blades, and having one circumferential edge sharpened to a razor edge, and being made of a corrosion resistant hardened steel, e) a tip having a sharp pointed conical shape and having a cylindrical shaped void extending into its interior from the base of said conical shape and said void having diameter equal to the diameter of said protuberance of said tapered tip shaft so as to fit together with a slight frictional force fit, and said tip being made of corrosion resistant hardened steel.

f) a snap ring means for holding the entire Arrow Ringed Broadhead assembly together after said blades with said ring blade are assembled into said grooves of said tapered tip shaft, said means accomplishing said assembly by sliding over said threaded portion and said extended shaft feature and into said semi-circular void of said blades which are in line with said snap ring groove.]

*2. An arrow broadhead tip comprising in combination the following components: a shaft, a conical tip, a plurality of triangular blades, and a ring blade, said triangular blades each having a substantially right triangular configuration with a hypotenuse side, a second longest side having a cutting edge and a shortest side, said shaft having a plurality of blade grooves which traverse the length of said shaft, said hypotenuse sides of said blades removably fitted into said grooves, said hypotenuse sides having rectangular voids that extend upwardly from said shaft to any point before or below said cutting edges of said second longest side, said ring blade encircling said shaft and tightly fitted into said rectangular voids at a circumferential portion, said ring blade having at a forward edge a sharpened portion, said conical tip fitted onto said shaft at a front or forwardmost portion of said shaft.*

*3. The broadhead tip of claim 2 wherein said shaft is tapered to a smaller diameter at said front portion.*

*4. The broadhead tip of claim 2 wherein said shaft has at a terminal rear portion a threaded section.*

*5. The broadhead tip of claim 2 wherein said blade grooves are located and spaced equidistant from each other around a circumference of said shaft.*

*6. The broadhead tip of claim 2 wherein there are three grooves in said shaft spaced about 120 degrees apart.*

*7. The broadhead tip of claim 2 wherein said second longest side having said cutting edge located at the upper outer portion of each triangular blade, said hypotenuse being at a lower-inner portion of each triangular blade.*

*8. The broadhead tip of claim 2 wherein said second longest side has a slight inward curvature.*

*9. The broadhead tip of claim 2 wherein said rectangular voids extend up to about midway from the distance of the hypotenuse to the junction of said second longest side and said shortest side.*

*10. The broadhead tip of claim 2 which has a rectangular portion containing a grooved section which overlaps rear corners of each triangular blade.*

*11. The broadhead tip of claim 2 wherein said ring blade has a hollow cylindrical shape of length substantially equal to the widths of said rectangular voids so as to fit tightly therein.*

*12. The broadhead tip of claim 2 wherein measured from said shaft at a shaft location encircled by said ring blade, said ring blade has a radius smaller than the distance of the cutting edges of any of said second longest sides from the shaft at said shaft location.*

*13. The broadhead tip of claim 2 wherein said hypotenuse sides of said triangular blades are connected via their rectangular voids by said ring blade, said ring blade also encircling said shaft.*

*14. The broadhead tip of claim 2 wherein said cutting edges define outermost portions of said broadhead tip, said ring blade being smaller in diameter than said outermost portions.*

* * * * *